United States Patent
Hamakubo et al.

(10) Patent No.: US 12,528,926 B2
(45) Date of Patent: Jan. 20, 2026

(54) RESIN COMPOSITION, SECONDARY COATING MATERIAL FOR OPTICAL FIBER, OPTICAL FIBER, AND METHOD FOR MANUFACTURING OPTICAL FIBER

(71) Applicant: SUMITOMO ELECTRIC INDUSTRIES, LTD., Osaka (JP)

(72) Inventors: Katsushi Hamakubo, Osaka (JP); Chiaki Tokuda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 101 days.

(21) Appl. No.: 18/039,334

(22) PCT Filed: Nov. 12, 2021

(86) PCT No.: PCT/JP2021/041723
§ 371 (c)(1),
(2) Date: May 30, 2023

(87) PCT Pub. No.: WO2022/130855
PCT Pub. Date: Jun. 23, 2022

(65) Prior Publication Data
US 2023/0416483 A1     Dec. 28, 2023

(30) Foreign Application Priority Data
Dec. 16, 2020   (JP) ................................ 2020-208202

(51) Int. Cl.
*C08J 7/18*     (2006.01)
*C08K 3/36*     (2006.01)

(52) U.S. Cl.
CPC .................. *C08J 7/18* (2013.01); *C08K 3/36* (2013.01); *C08J 2499/00* (2013.01); *C08K 2201/005* (2013.01)

(58) Field of Classification Search
CPC .................................................. G02B 6/02395
See application file for complete search history.

(56) References Cited

U.S. PATENT DOCUMENTS

| | | | |
|---|---|---|---|
| 2016/0299310 A1 | 10/2016 | Kaneko et al. | |
| 2021/0009854 A1 | 1/2021 | Hamakubo | |
| 2021/0181410 A1* | 6/2021 | Hamakubo | ......... C08F 283/008 |

FOREIGN PATENT DOCUMENTS

| | | | | |
|---|---|---|---|---|
| CN | 109485051 A | | 3/2019 | |
| JP | 2004-204206 A | | 7/2004 | |
| JP | 2006137795 A | * | 6/2006 | |
| JP | 2011506259 A | * | 3/2011 | ........... C09C 1/3081 |
| JP | 2014-089431 A | | 5/2014 | |
| WO | WO-2010/064535 A1 | | 6/2010 | |

(Continued)

OTHER PUBLICATIONS

JP2006137795A, machine translation, 2006. (Year: 2006).*

*Primary Examiner* — Michael H Caley
(74) *Attorney, Agent, or Firm* — Faegre Drinker Biddle & Reath LLP

(57) ABSTRACT

A resin composition contains a base resin containing a photopolymerizable compound and a photopolymerization initiator, and surface-modified silica particles, wherein the surface-modified silica particles have, as a silicone structural unit, a T unit in which three oxygen atoms are bonded to a silicon atom, and the proportion of a T1 unit contained in the T unit is 29 mol % or less.

5 Claims, 1 Drawing Sheet

(56) References Cited

FOREIGN PATENT DOCUMENTS

| WO | WO-2013/115191 A1 | 8/2013 | | |
|----|-------------------|--------|---|---|
| WO | WO-2016/080195 A1 | 5/2016 | | |
| WO | WO-2019116967 A1 * | 6/2019 | ........... | C03C 25/105 |
| WO | WO-2020/101030 A1 | 5/2020 | | |

* cited by examiner

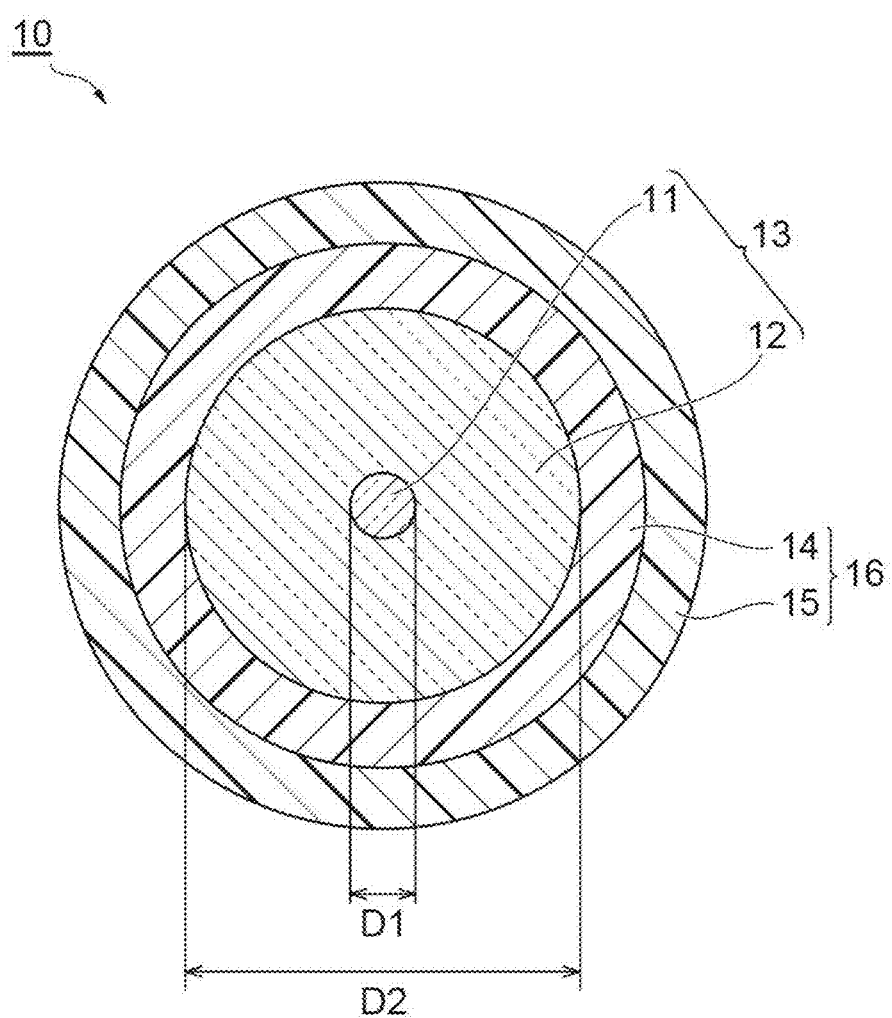

RESIN COMPOSITION, SECONDARY COATING MATERIAL FOR OPTICAL FIBER, OPTICAL FIBER, AND METHOD FOR MANUFACTURING OPTICAL FIBER

TECHNICAL FIELD

The present disclosure relates to a resin composition, a secondary coating material for an optical fiber, an optical fiber, and a method for manufacturing an optical fiber.

This application claims priority based on Japanese Patent Application No. 2020-208202 filed on Dec. 16, 2020, and incorporates all the contents described in the Japanese application.

BACKGROUND ART

An optical fiber has generally a coating resin layer for protecting a glass fiber that is an optical transmission medium. The coating resin layer comprises, for example, a primary resin layer and a secondary resin layer.

In order to identify an optical fiber, a colored layer may be formed on the outermost layer of the optical fiber. It is known that the colored layer is formed on the outer periphery of the secondary resin layer by temporarily winding the optical fiber coated with the primary resin layer and the secondary resin layer and then feeding out the optical fiber again (for example, refer to Patent Literature 1).

CITATION LIST

Patent Literature

[Patent Literature 1] WO 2016/080195 A1

SUMMARY OF INVENTION

A resin composition according to an aspect of the present disclosure comprises a base resin containing a photopolymerizable compound and a photopolymerization initiator, and surface-modified silica particles, wherein the surface-modified silica particles have, as a silicone structural unit, a T unit in which three oxygen atoms are bonded to a silicon atom, and the proportion of a T1 unit contained in the T unit is 29 mol % or less.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

In the shipment of an optical fiber, a rewinding work may be performed from a large bobbin to a small bobbin. When the scratch resistance of the surface of the secondary resin layer is low, scratches may be generated on the surface of the secondary resin layer in winding, and the resin layer may be broken to significantly deteriorate the optical characteristics. Therefore, the secondary resin layer is required to have excellent scratch resistance (abrasion resistance).

An object of the present disclosure is to provide: a resin composition capable of forming a resin layer having excellent scratch resistance; and an optical fiber comprising a secondary resin layer formed from the resin composition and capable of preventing scratches in a rewinding work.

Effect of the Present Disclosure

The present disclosure can provide: a resin composition capable of forming a resin layer having excellent scratch resistance; and an optical fiber comprising a secondary resin layer formed from the resin composition and capable of preventing scratches in a rewinding work.

DESCRIPTION OF EMBODIMENTS OF THE PRESENT DISCLOSURE

First, the contents of the embodiment of the present disclosure will be described by listing them. A resin composition according to an aspect of the present disclosure comprises a base resin containing a photopolymerizable compound and a photopolymerization initiator, and surface-modified silica particles, wherein the surface-modified silica particles have, as a silicone structural unit, a T unit in which three oxygen atoms are bonded to a silicon atom, and the proportion of T1 units contained in the T unit is 29 mol % or less.

Curing a resin composition containing surface-modified silica particles having a specific silicone structural unit can form a resin layer having excellent scratch resistance.

The surface-modified silica particles may have at least one ultraviolet curable group selected from the group consisting of an acryloyl group, a methacryloyl group, and a vinyl group. This makes it easier to form a resin layer with a high Young's modulus.

From the viewpoint of forming a resin layer having a high Young's modulus, the content of the surface-modified silica particles may be 1% by mass or more and 60% by mass or less based on the total amount of the resin composition.

From the viewpoint of forming a resin layer having superior scratch resistance, the average primary particle size of the surface-modified silica particles may be 100 nm or less.

The secondary coating material for the optical fiber according to an aspect of the present disclosure comprises the above resin composition. A coating resin layer having excellent scratch resistance can be formed by using the resin composition according to the present embodiment in the secondary resin layer.

The optical fiber according to an aspect of the present disclosure comprises: a glass fiber comprising a core and a cladding; a primary resin layer being in contact with the glass fiber and coating the glass fiber; and a secondary resin layer coating the primary resin layer, wherein the secondary resin layer comprises a cured product of the above resin composition. This can prevent the surface of the secondary resin layer from being damaged and the resin layer from being broken when the rewinding work is performed from the large bobbin to the small bobbin.

A method for manufacturing the optical fiber according to an aspect of the present disclosure comprises: an application step of applying the above resin composition to the outer periphery of a glass fiber composed of a core and a cladding; and a curing step of curing the resin composition by irradiating with ultraviolet rays after the application step. This can produce an optical fiber capable of preventing scratches in the rewinding work.

Detail of Embodiment of the Present Disclosure

Specific examples of a resin composition and an optical fiber according to the embodiments of the present disclosure will be described referring to the drawing as necessary. The present disclosure is not limited to these illustrations but is indicated by the claims and intended to include meanings equivalent to the claims and all modifications within the claims. In the following description, the same reference numerals are given to the same elements in the description of the drawing, and redundant explanations are omitted. (Meth)acrylate as used herein means an acrylate or its corresponding methacrylate. The same applies to other similar expressions such as (meth)acryloyl.

<Resin Composition>

The resin composition according to the present embodiment is an ultraviolet curable resin composition comprising a base resin containing a photopolymerizable compound and a photopolymerization initiator, and surface-modified silica particles.

(Surface-Modified Silica Particles)

The constituent units of silicone possessed by silicone compounds are generally classified into a M unit (unit in which one oxygen atom is bonded to a silicon atom), a D unit (unit in which two oxygen atoms are bonded to a silicon atom), a T unit (unit in which three oxygen atoms are bonded to a silicon atom), and a Q unit (unit in which four oxygen atoms are bonded to a silicon atom). The structures of the M unit, the D unit, the T unit, and the Q unit can be represented by the following formula. In the formula, R represents a monovalent organic group.

[Chemical Formula 1]

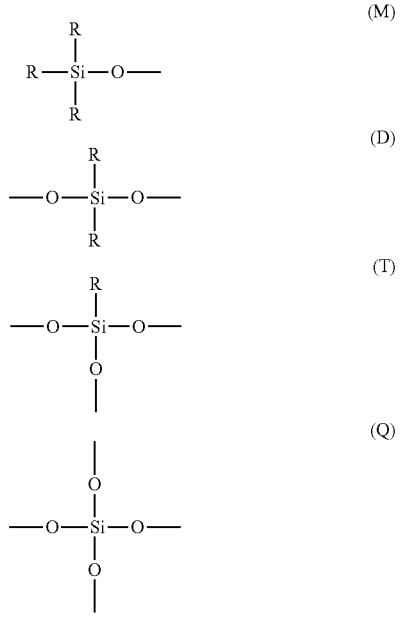

The T unit is a structure derived from a silane compound represented by R—Si—(OR')$_3$. R represents a monovalent organic group. Examples of the monovalent organic group include an alkyl group, a phenyl group, a (meth)acryloxyalkyl group, an alkenyl group, a styryl group, and a vinyl group. R' represents an alkyl group such as a methyl group or an ethyl group.

Depending on the degree of condensation of the silane compound, a T unit comprises: a T1 unit in which one oxygen atom is bonded to another silicon atom; a T2 unit in which two oxygen atoms are bonded to another silicon atom; and a T3 unit in which three oxygen atoms are bonded to another silicon atom. The structures of the T1 unit, T2 unit, and T3 unit can be represented by the following formula.

[Chemical Formula 2]

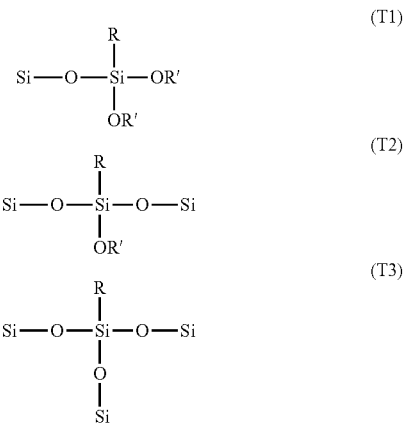

The proportion of each structural unit can be calculated by measuring the solid $^{29}$Si-NMR spectrum of the silicone compound (for example, refer to "Structural Analysis of Silicon Containing Materials by $^{29}$Si NMR", Research Report of Asahi Glass Co., Ltd. 66 (2016), pp. 32-36).

Silica particles that are not surface-modified are mainly composed of the Q unit. The surface-modified silica particles according to the present embodiment have the Q unit based on the siloxane structure of the silica particles before surface modification and the T unit based on the siloxane structure introduced by surface modification. In the solid $^{29}$Si-NMR spectrum, the chemical shift of the Q unit is observed in the range of −90 ppm to −120 ppm, and the chemical shift of the T unit is observed in the range of −35 ppm to −75 ppm, respectively. In the T unit, the T1 unit has a peak top around 50 ppm, the T2 unit has a peak top around 60 ppm, and the T3 unit has a peak top around 70 ppm. Therefore, integrating the signal of the T unit possessed by the surface-modified silica particles can calculate the proportion of each unit of T1, T2, and T3 from the signal area.

The T unit is introduced into the surface-modified silica particles according to the present embodiment by treating the surface of the silica particles with a silane compound. The proportion of the T1 unit contained in the T unit possessed by the surface-modified silica particles is 29 mol % or less, preferably 28 mol % or less, and more preferably 26 mol % or less, from the viewpoint of forming a resin layer having excellent scratch resistance. The lower limit of the proportion of the T1 unit may be 1 mol % or more, 5 mol % or more, or 8 mol % or more.

The proportions of the T2 unit and T3 unit contained in the T unit are not particularly limited. The proportion of the T2 unit may be, for example, 10 mol % or more, 15 mol % or more, or 20 mol % or more, and may be 70 mol % or less, 68 mol % or less, or 66 mol % or less. The proportion of the T3 unit may be, for example, 1 mol % or more, 4 mol % or more, or 6 mol % or more, and may be 70 mol % or less, 64 mol % or less, or 62 mol % or less.

The silane compound may be a silane compound having an ultraviolet-curable group. When the silane compound having an ultraviolet-curable group is used, examples of R in the T unit and T1 unit include a (meth)acryloxyalkyl group, an alkenyl group, a styryl group, and a vinyl group, and examples of R' include a methyl group and an ethyl group. The surface-modified silica particles having an acryloyl group, a methacryloyl group, or a vinyl group allow formation of a resin layer having superior scratch resistance.

Examples of the silane compound having an ultraviolet-curable group include 3-methacryloxypropyltrimethoxysilane, 3-acryloxypropyltrimethoxysilane, 3-methacryloxypropyltriethoxysilane, 3-acryloxypropyltriethoxysilane, 8-methacryloxyoctyltrimethoxysilane, 8-acryloxyoctyltrimethoxysilane, 7-octenyltrimethoxysilane, p-styryltrimethoxysilane, vinyltrimethoxysilane, and vinyltriethoxysilane.

The surface-modified silica particles according to the present embodiment are dispersed in a dispersion medium. Using the surface-modified silica particles dispersed in the dispersion medium can uniformly disperse the surface-modified silica particles in the resin composition, and can improve the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth)acrylate, 2-hydroxy-3-phenoxypropyl(m eth)acrylate, (meth)acrylic acid adduct of propylene glycol diglycidyl ether, (meta)acrylic acid adduct of tripropylene glycol diglycidyl ether, and (meth)acrylic acid adduct of glycerin diglycidyl ether. As the (meth)acryloyl compound, the compounds exemplified in the monomers described later may be used.

As a non-reactive dispersion medium, a ketone solvent such as methyl ethyl ketone (MEK), an alcohol solvent such as methanol (MeOH) and propylene glycol monomethyl ether (PGME), or an ester solvent such as propylene glycol monomethyl ether acetate (PGMEA) may be used. In the case of a non-reactive dispersion medium, the resin composition may be prepared by mixing the base resin and the surface-modified silica particles dispersed in the dispersion medium, and then removing a part of the dispersion medium.

From the viewpoint of reducing the proportion of the T1 unit, the surface-modified silica particles are preferably dispersed in the alcohol solvent, more preferably in MeOH.

From the viewpoint of further improving the scratch resistance of the resin layer, the average primary particle size of the surface-modified silica particles is preferably 100 nm or less, and may be 90 nm or less or nm or less. From the viewpoint of increasing the strength of the secondary resin layer, the average primary particle size of the surface-modified silica particles may be 1 nm or more, 2 nm or more, or 5 nm or more. The average primary particle size can be measured, for example, by image analysis of electron micrographs, the light scattering method, and the BET method. The average primary particle size can be measured according to the method described in any of JIS Z 8827-1, JIS Z 8827-2, JIS Z 8828, or JIS Z 8830. A dispersion medium in which primary particles of silica particles are dispersed appears transparent to the naked eye when the primary particles have a small particle size. When the particle size of the primary particles is relatively large (40 nm or more), the dispersion medium in which the primary particles are dispersed appears cloudy, but no sediment is observed.

The content of the surface-modified silica particles is preferably 1% by mass or more and 60% by mass or less, 3% by mass or more and 50% by mass or less, 5% by mass or more and 40% by mass or less, or 10% by mass or more and 35% by mass or less, based on the total amount of resin composition (total amount of the base resin and surface-modified silica particles). The content of the surface-modified silica particles of 1% by mass or more easily forms a resin layer with a high Young's modulus. The content of the surface-modified silica particles of 60% by mass or less can easily improve the application properties of the resin composition, and can form a resin layer having excellent toughness.

(Base Resin)

The base resin according to the present embodiment contains a photopolymerizable compound and a photopolymerization initiator. The photopolymerizable compound according to the present embodiment can comprise urethane (meth)acrylate from the viewpoint of adjusting Young's modulus. The photopolymerizable compound according to the present embodiment does not comprise surface-modified silica particles having an ultraviolet-curable group.

As the urethane (meth)acrylate, a urethane oligomer obtained by reacting a polyol compound, a polyisocyanate compound, and a hydroxyl group-containing (meth)acrylate compound can be used. The urethane (meth)acrylate may be used in combination of two or more.

Examples of the polyol compound include polytetramethylene glycol, polypropylene glycol, and bisphenol A-ethylene oxide addition diol. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

From the viewpoint of adjusting the Young's modulus of the resin layer, the number average molecular weight (Mn) of the polyol compound may be 300 or more and 3000 or less, 400 or more and 3000 or less, or 500 or more and 2500 or less.

As a catalyst for synthesizing urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, it is preferable that dibutyltin dilaurate or dibutyltin diacetate be used as catalyst.

A lower alcohol having 5 or less carbon atoms may be used when synthesizing the urethane (meth)acrylate. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The photopolymerizable compound according to the present embodiment may comprise epoxy (meth)acrylate from the viewpoint of adjusting Young's modulus. Examples of the epoxy (meth)acrylate include an aliphatic epoxy (meth)acrylate and an aromatic epoxy (meth)acrylate. The aliphatic epoxy (meth)acrylate means an epoxy (meth)acrylate having no aromatic ring, and the aromatic epoxy (meth)acrylate means an epoxy (meth)acrylate having the aromatic ring.

As the aliphatic epoxy (meth)acrylate, a reaction product of an aliphatic epoxy compound having two or more glycidyl groups and a compound having a (meth)acryloyl group such as (meth)acrylic acid can be used.

From the viewpoint of increasing the toughness of the resin layer, the aliphatic epoxy (meth)acrylate preferably has an ethylene oxide group or a propylene oxide group. Examples of the aliphatic epoxy (meth)acrylates include a (meth)acrylic acid adduct of propylene glycol diglycidyl ether, a (meth)acrylic acid adduct of polypropylene glycol diglycidyl ether, a (meth)acrylic acid adduct of ethylene glycol diglycidyl ether, and a (meth)acrylic acid adduct of polyethylene glycol diglycidyl ether.

Examples of commercially available aliphatic epoxy (meth)acrylates include trade names "Epoxyester 40EM", "Epoxyester 70PA", "Epoxyester 200PA", and "Epoxyester 80MFA", manufactured by Kyoeisha Chemical Co., Ltd.

As the aromatic epoxy (meth)acrylate, a reaction product of an aromatic epoxy compound having two or more glycidyl groups and a compound having a (meth)acryloyl group such as (meth)acrylic acid can be used. Examples of the aromatic epoxy (meth)acrylate include a (meth)acrylic acid adduct of bisphenol A diglycidyl ether.

From the viewpoint of increasing the strength of the resin layer, the content of the epoxy (meth)acrylate may be 10% by mass or more and 70% by mass or less, 20% by mass or more and 60% by mass or less, or 30% by mass or more and 50% by mass or less, based on the total amount of the photopolymerizable compound.

The photopolymerizable compound according to the present embodiment can comprise a photopolymerizable compound (hereinafter referred to as "monomer") other than the urethane (meth)acrylate and the epoxy (meth)acrylate.

The monofunctional monomer having one polymerizable group and the multifunctional monomer having two or more polymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing monomers such as N-(meta)acryloyl morpholine, N-vinyl pyrrolidone, N-vinyl caprolactam, N-(meta)acryloylpiperidine, N-(meta)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-ethyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dim ethyl amino ethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, EO adduct of bisphenol A di(meth)acrylate, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate and caprolactone-modified tris[(meth)acryloyloxyethyl] isocyanurate.

The photopolymerization initiator can be appropriately selected from known radical photopolymerization initiators and used. Examples of the photopolymerization initiator include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

The content of the photopolymerization initiator may be 0.2% by mass or more and 6.0% by mass or less, 0.4% by mass or more and 3.0% by mass or less, or 0.6% by mass or more and 2.0% by mass or less, based on the total amount of the photopolymerizable compounds.

The resin composition may further contain a silane coupling agent, a leveling agent, an antifoaming agent, an antioxidant, a sensitizer, or the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-β-aminoethyl)-γ-aminopropyltrimethoxysilane, N-β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

The resin composition according to the present embodiment is preferably used as the secondary coating material for the optical fiber. Using the resin composition according to the present embodiment for the secondary resin layer can form the coating resin layer having excellent scratch resistance.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 μm. The outside diameter of the optical fiber 10 may be about 144 μm to 174 μm.

The resin composition according to the present embodiment can be applied to the secondary resin layer. The secondary resin layer can be formed by curing a resin composition comprising the surface-modified silica particles and the base resin. The secondary resin layer 15 comprises a cured product of the resin composition according to the present embodiment. This can prevent the surface of the secondary resin layer from being damaged and the resin layer from being broken when the rewinding work is performed from the large bobbin to the small bobbin. In addition, the anti-blocking effect prevents the fibers from sticking to each other, and the optical fiber can be wound around the small bobbin without winding abnormality such as winding skip.

A method for manufacturing the optical fiber according to the present embodiment comprises: an application step of applying the above resin composition to the outer periphery of a glass fiber composed of a core and a cladding; and a curing step of curing the resin composition by irradiating with ultraviolet rays after the application step. Coating a glass fiber with the resin composition according to the present embodiment can manufacture an optical fiber that can prevent scratch during rewinding work. The resin composition according to the present embodiment is not directly applied to the glass fiber, but the resin composition for primary coating is directly applied to the glass fiber. That is, in the application step, the primary coating that is in contact with the glass fiber and the secondary coating that is not in contact with the glass fiber by the resin composition according to the present embodiment are formed.

The Young's modulus of the secondary resin layer at 23° C. is preferably 1300 MPa or more and 3600 MPa or less, more preferably 1400 MPa or more and 3000 MPa or less, and further preferably 1600 MPa or more and 2800 MPa or less. The Young's modulus of the secondary resin layer of 1300 MPa or more is easy to improve the lateral pressure characteristics, and the Young's modulus of 3500 MPa or less can provide proper toughness to the secondary resin layer, and thus can be hard to occur a crack or the like in the secondary resin layer.

The primary resin layer 14 can be formed, for example, by curing a resin composition comprising a urethane (meth) acrylate, a monomer, a photopolymerization initiator, and a silane coupling agent. Prior art techniques can be used for a resin composition for the primary resin layer. A urethane (meth)acrylate, a monomer, a photopolymerization initiator, and a silane coupling agent may be appropriately selected from compounds exemplified in the above base resin. The resin composition constituting the primary resin layer has composition different from the base resin forming the secondary resin layer.

A plurality of optical fibers may be arranged in parallel and integrated with a resin for ribbon to form an optical fiber ribbon. The resin composition according to the present disclosure can also be used as a resin for ribbon. This can improve scratch resistance and lateral pressure characteristics of the optical fiber ribbon.

EXAMPLES

Hereinafter, the results of evaluation tests using test examples according to the present disclosure will be shown, and the present disclosure is described in more detail. The present invention is not limited to these test examples.

[Preparation of Resin Composition]

(Urethane Acrylate)

As the urethane acrylate, a urethane acrylate (UA-1) obtained by reacting polypropylene glycol having Mn of 600, 2,4-tolylene diisocyanate, and 2-hydroxyethyl acrylate, and a urethane acrylate (UA-2) obtained by reacting polypropylene glycol having Mn of 12000, 2,4-tolylene diisocyanate, and 2-hydroxyethyl acrylate were prepared.

(Epoxy Acrylate)

As an epoxy acrylate (EA), a (meth)acrylic acid adduct of bisphenol A diglycidyl ether (trade name "Viscoat 540", manufactured by Osaka Organic Chemical Industry Ltd.) was prepared.

(Monomer)

As a monomer, isobornyl acrylate (trade name "IBXA", manufactured by Osaka Organic Chemical Industry Ltd.), 2-phenoxyethyl acrylate (trade name "Light Acrylate PO-A", manufactured by Kyoeisha Chemical Co., Ltd.), and tripropylene glycol diacrylate (trade name "TPGDA", manufactured by Daicel-Allnex Ltd.) were prepared.

(Photopolymerization Initiator)

As a photopolymerization initiator, 2,4,6-trimethylbenzoyldiphenylphosphine oxide (Omnirad TPO) was prepared.

(Surface-Modified Silica Particles)

As surface-modified silica particles, a silica sol including silica particles surface-treated with 3-methacryloxypropyltrimethoxysilane shown in Table 1 was prepared. The proportion of each structural unit possessed by the surface-modified silica particles was calculated by measuring the solid $^{29}$Si-NMR spectrum according to the procedure shown below.

Four mL of each silica sol was sampled, subjected to evaporation of a dispersion medium in the atmosphere, and then dried in a constant temperature bath at 80° C. for 24 hours to isolate the surface-modified silica particles. Surface-treated silica particles of 200 mg were added to an acetone solution including 13.7 mg of chromium (III) acetylacetonate ($Cr(acac)_3$) as a relaxation reagent, and then ultrasonic treatment was performed for 30 minutes to obtain a mixed solution. $Cr(acac)_3$ was added in an amount of 1% by mass relative to Si in terms of Cr. The mixed solution was dried in a constant temperature bath at 90° C. for 24 hours to prepare a sample for NMR measurement.

The solid $^{29}$Si-NMR spectrum of the sample was measured by the DD-MAS method under the following conditions, and the proportions of the T1 unit, T2 unit, and T3 unit to the T unit possessed by the surface-modified silica particles were calculated.

Measuring device: Ascend500+AVANCE III HD (Bruker Japan Ltd.)
Probe: 4 mmϕ MAS VTN probe
MAS rotation speed: 8 kHz
Cumulative count: 2048

The following evaluations were performed using the resin compositions obtained in the test examples. The results are shown in Table 2.

(Young's Modulus)

A resin composition was applied to a polyethylene terephthalate (PET) film using a spin coater, and cured using an electrodeless UV lamp system (D bulb) (manufactured by Heraeus K. K.) under the conditions of 1000±100 mJ/cm$^2$ to form a resin layer having a thickness of 200±20 μm on the PET film. The resin layer was peeled off from the PET film to obtain a resin film.

The resin film was punched into a dumbbell shape of JIS K 7127 type 5, and pulled under the conditions of 23±2° C. and 50±10% RH using a tensile tester at a tensile speed of 1 mm/min and a gauge line distance of 25 mm to obtain a stress-strain curve. The Young's modulus of the resin film was obtained from the tangent line.

[Production of Optical Fiber]

A urethane acrylate (UA-3) obtained by reacting polypropylene glycol having a molecular weight of 4000, isophorone diisocyanate, hydroxyethyl acrylate, and methanol was prepared. 75 parts by mass of UA-3, 12 parts by mass of nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to prepare a resin composition for the primary resin layer.

The resin composition for the primary resin layer and the resin composition of test examples for the secondary resin layer were applied to the outer periphery of a 125 μm diameter glass fiber composed of a core and a cladding, and then the resin composition was cured by irradiating with ultraviolet rays and a primary resin layer with a thickness of 35 μm and a secondary resin layer with a thickness of 25 μm around the outer periphery thereof were formed to produce an optical fiber. A linear speed was 1500 m/min.

(Lateral Pressure Characteristics)

The transmission loss of light with a wavelength of 1550 nm was measured by the OTDR (Optical Time Domain Reflectometer) method when the optical fiber was wound in a single layer on a bobbin having a diameter of 280 mm with its surface covered with sandpaper. In addition, the transmission loss of light with a wavelength of 1550 nm was measured by the OTDR method when the optical fiber was

TABLE 1

| Silica sol | Si-1 | Si-2 | Si-3 | Si-4 | Si-5 | Si-6 | Si-7 |
| --- | --- | --- | --- | --- | --- | --- | --- |
| Dispersion medium | MeOH | MeOH | MeOH | MeOH | MeOH | MeOH | MEK |
| Average primary particle size (nm) | 5-10 | 10-15 | 10-15 | 15-20 | 20-25 | 40-70 | 10-15 |
| T1(%) | 25 | 20 | 10 | 10 | 10 | 10 | 30 |
| T2(%) | 65 | 60 | 50 | 50 | 40 | 30 | 45 |
| T3(%) | 10 | 20 | 40 | 40 | 50 | 60 | 25 |

(Resin Composition)

A photopolymerizable compound and a photopolymerization initiator were mixed in the amount (parts by mass) shown in Table 2 with 1 part by mass of Omnirad TPO to prepare a base resin. The base resin and a silica sol were mixed, and then most of the dispersion medium was removed to prepare a resin composition for each test example so that the content of the surface-modified silica particles in the resin composition was 30% by mass. Test Examples 1 to 6 correspond to Examples, and Test Example 7 corresponds to Comparative Example.

wound in a single layer on a bobbin of 280 mm diameter without sandpaper. A difference in the measured transmission loss was obtained, and a case where the transmission loss difference was 0.6 dB/km or less was evaluated as "A", and a case where the transmission loss difference was more than 0.6 dB/km was evaluated as "B".

(Rewinding Rate)

The rate at which the transmission loss increased when the optical fiber was rewound from the large bobbin to the small bobbin was defined as the rewinding rate. The case where the rewinding rate was 0% was evaluated as "A", the case where the rewinding rate was more than 0% and less than 30% was evaluated as "B", and the case where the rewinding rate was 30% or more was evaluated as "C".

TABLE 2

| Test Example | 1 | 2 | 3 | 4 | 5 | 6 | 7 |
|---|---|---|---|---|---|---|---|
| Silica sol | Si-1 | Si-2 | Si-3 | Si-4 | Si-5 | Si-6 | Si-7 |
| UA-1 | 20 | 20 | 20 | 20 | 20 | 20 | 20 |
| UA-2 | 1 | 1 | 1 | — | 1 | 1 | 1 |
| EA | 40 | 40 | 40 | 40 | 40 | 40 | 40 |
| IBXA | 15 | 15 | 15 | 15 | 15 | 15 | 15 |
| POA | 20 | 20 | 20 | 20 | 20 | 20 | 20 |
| TPGDA | 4 | 4 | 4 | 5 | 4 | 4 | 4 |
| Young's modulus (MPa) | 2600 | 2500 | 2500 | 2400 | 2300 | 2200 | 2200 |
| Lateral pressure characteristics | A | A | A | A | A | A | A |
| Rewinding rate | A | A | A | A | A | A | B |

REFERENCE SIGNS LIST

10: Optical fiber
11: Core,
12: Cladding
13: Glass fiber
14: Primary resin layer
15: Secondary resin layer
16: Coating resin layer.

The invention claimed is:

1. An optical fiber comprising:
  a glass fiber comprising a core and a cladding;
  a primary resin layer being in contact with the glass fiber and coating the glass fiber; and
  a secondary resin layer coating the primary resin layer,
  wherein the secondary resin layer comprises a cured product of a resin composition comprising a base resin containing a photopolymerizable compound and a photopolymerization initiator; and surface-modified silica particles,
  wherein the surface-modified silica particles have, as a silicone structural unit, a T unit in which three oxygen atoms are bonded to a silicon atom, and a proportion of a T1 unit, in which one oxygen atom is bonded to another silicon atom, contained in the T unit is 29 mol % or less, and
  wherein the proportion of the T1 unit contained in the T unit is 10 mol % or more.

2. The optical fiber according to claim 1, wherein the surface-modified silica particles have at least one ultraviolet-curable group selected from the group consisting of an acryloyl group, a methacryloyl group, and a vinyl group.

3. The optical fiber according to claim 1, wherein a content of the surface-modified silica particles is 1% by mass or more and 60% by mass or less, based on a total amount of the resin composition.

4. The optical fiber according to claim 1, wherein an average primary particle size of the surface-modified silica particles is 100 nm or less.

5. The optical fiber according to claim 4, wherein the average primary particle size of the surface-modified silica particles is 1 nm or more.

* * * * *